(12) United States Patent
Wacker (10) Patent No.: US 8,601,980 B2
(45) Date of Patent: Dec. 10, 2013

(54) PORTABLE DRINKING BOWL WITH WATER RESERVOIR FOR PETS

(76) Inventor: Philipp Wacker, Bad Urach (DE)

( * ) Notice: Subject to any disclaimer, the term of this patent is extended or adjusted under 35 U.S.C. 154(b) by 279 days.

(21) Appl. No.: 13/188,929

(22) Filed: Jul. 22, 2011

(65) Prior Publication Data

US 2012/0210942 A1     Aug. 23, 2012

(30) Foreign Application Priority Data

Feb. 22, 2011    (DE) ...................... 20 2011 000 410 U (51) Int. Cl.
    *A01K 7/00*        (2006.01)

(52) U.S. Cl.
    USPC .............. 119/72; 119/74; 119/61.5; 222/213; 220/720

(58) Field of Classification Search
    USPC ................ 119/72, 74–81, 61.5–61.55, 61.56, 119/61.57; D30/121, 132, 133, 131, 129, D30/130; 220/501, 502, 720, 721, 503, 504, 220/505, 575; 222/205, 206, 209, 212, 213, 222/215

See application file for complete search history.

(56) References Cited

U.S. PATENT DOCUMENTS

| | | | | |
|---|---|---|---|---|
| 169,735 | A | * 11/1875 | Schirmer | ........................ 222/585 |
| 3,076,435 | A | * 2/1963 | Seymour | ........................... 119/77 |
| 5,284,173 | A | * 2/1994 | Graves et al. | ..................... 137/1 |
| 5,312,019 | A | * 5/1994 | Tsao | .............................. 222/105 |
| 5,518,315 | A | * 5/1996 | Nichols | ........................ 383/119 |
| 5,603,573 | A | * 2/1997 | Mercier et al. | ................ 383/117 |
| 5,636,592 | A | 6/1997 | Wechsler | |
| 5,809,934 | A | 9/1998 | Gavet | |
| 5,809,935 | A | 9/1998 | Kolterman et al. | |
| 5,960,742 | A | 10/1999 | O'Rourke et al. | |
| 5,961,004 | A | * 10/1999 | DeMars | ......................... 222/205 |
| 6,101,974 | A | * 8/2000 | Frohlich | ....................... 119/51.5 |
| 8,011,324 | B1 | * 9/2011 | Warganich | ....................... 119/77 |
| 2006/0236948 | A1 | 10/2006 | Wechsler | |
| 2007/0079762 | A1 | 4/2007 | Stephanos | |
| 2008/0115732 | A1 | 5/2008 | Stenberg | |
| 2010/0050950 | A1 | * 3/2010 | Graves et al. | .................... 119/81 |

FOREIGN PATENT DOCUMENTS

| | | | |
|---|---|---|---|
| DE | 3139778 A1 | * 4/1983 | ............... A01K 7/00 |
| WO | 93/22906 | 11/1993 | |
| WO | WO 93/22906 | * 11/1993 | ............... A01K 7/06 |
| WO | 2008/115081 A1 | 9/2008 | |

* cited by examiner

*Primary Examiner* — Andrea Valenti
(74) *Attorney, Agent, or Firm* — Thomas | Horstemeyer, LLP (57) ABSTRACT

A portable drinking device for pets being suitable for use when travelling includes a rigid wall structure, a water outlet passage, a water outlet valve and a removable closure element.

20 Claims, 6 Drawing Sheets

PORTABLE DRINKING BOWL WITH WATER RESERVOIR FOR PETS

CROSS REFERENCE TO RELATED APPLICATIONS

This application claims priority to German Utility Model Application DE 20 2011 000 410.4 entitled "Reisetrinknapf für Haustiere", filed on Feb. 22, 2011.

FIELD OF THE INVENTION

The present invention relates to a portable drinking device for pets. Particularly, the present invention relates to a portable drinking device for pets which is suitable for use when travelling.

Not only when the weather is warm it is necessary that pets which, for example, accompany their travelling owner are regularly supplied with drinking water. Puddles and all non-flowing waters and even some flowing waters are not suited for watering a dog, a cat or any other pet as they may be loaded with microorganisms and other pathogens.

PRIOR ART

Some portable drinking devices which are inter alia known from US 2007/0079762 A1 and U.S. Pat. No. 5,636,592 A comprise a combination of an elongated drinking bowl, of a bottle made of elastically deformable material, and of a cap closing the bottle and comprising a water outlet valve. In a transport position, the drinking bowl is attached to the bottle and partially encloses the bottle so that the transport dimensions of the whole portable drinking device are not much greater than those of the drinking bowl. For watering a pet, the bottle is attached to the drinking bowl in an inclined upside-down position. Upon pressing the bottle, water emerges out of the water outlet valve in the cap of the bottle. If the water outlet valve is of a type which always lets out water when a sufficient pressure is applied to the bottle, there is the danger that water is spilled accidentally. On the other hand, if the water outlet valve has at first to be opened manually, an additional step has to be made in handling the known portable drinking device in addition to attaching the bottle to the drinking bowl in the inclined upside-down position and pressing the bottle.

Other known portable drinking devices include a drinking bowl having an upper rim of an upside down U-shape. This rim is intended to avoid spilling of liquids when the drinking bowl is moved. For watering a pet, a separate water bottle is needed to fill the drinking bowl of this known portable drinking device with water.

There still is a need for a portable drinking device which is more easily handled than the known portable drinking devices and which is also has a much better visual appearance than known portable drinking devices for pets.

SUMMARY OF THE INVENTION

In a first aspect, the present invention provides a portable drinking device for pets which comprises a rigid wall structure, a water outlet passage, a water outlet valve, a removable closure element and an air inlet valve. The rigid wall structure provides a drinking bowl at its top, partially encloses a water reservoir below the drinking bowl and has an opening at its bottom. The water outlet passage starts in the water reservoir and leads into the drinking bowl. The water outlet valve is arranged in the water outlet passage, normally closes the water outlet passage, and comprises an actuation element which, when operated, actuates the water outlet valve to open the water outlet passage. The removable closure element closes the opening at the bottom of the wall structure and thus the water reservoir in a water-tight way. Further, the removable closure element includes an elastically deformable wall which, when pushed in, operates the actuation element of the water outlet valve and presses water out of the water reservoir through the opened outlet passage into the drinking bowl. The air inlet valve is a no-return valve and leads from outside the drinking bowl into the water reservoir.

In another aspect, the present invention provides a portable drinking device for pets which, in addition to the elements indicated above, comprises a closable transport bag which encloses the wall structure and the enclosure element and which includes a rigid transport cover plate for the elastically deformable wall. In this aspect, the air inlet valve is provided in the flexible wall at a point of a center of the flexible wall.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DESCRIPTION OF THE INVENTION

In the portable drinking device of the present invention, the water reservoir is arranged below the drinking bowl, and it is enclosed at its top and in all lateral directions by a shaped body or rigid wall structure also forming the drinking bowl. This basic design is a suitable basis for providing a highly esthetical appearance of the entire portable drinking device inclusive of its water reservoir. The outer appearance of the entire portable drinking device is defined by its rigid wall structure.

In the portable drinking device of the present invention, the water outlet valve is not already opened by water pressure in the water reservoir which may have other reasons, like for example an increase in temperature, than a voluntarily applying pressure to the deformable wall at the bottom of the water reservoir. Basically, however, the water outlet valve may also be a no-return valve in which a spring biases a movable valve body against a valve seat in a direction opposite to the flow direction of the water from the water reservoir into the drinking bowl. This valve body may directly be the actuation element which is operated when the elastically deformable wall is pushed-in to open the water outlet passage.

The water reservoir of the portable drinking device according to the present invention is also well protected within the rigid wall structure. When the rigid wall structure stands on the ground, the water reservoir is even fully protected and may, for example, not be compressed by a pet drinking from the drinking bowl, for example.

The separate water outlet and air inlet valves allow for a hassle-free operation of the portable drinking device of the present invention. The water outlet device which is only opened when the deformable wall is pushed in via its actuation element avoids that any water accidentally gets out of the water reservoir. The air inlet valve, on the other hand, only allows for air entering the water reservoir to fill the space of water previously pressed out through the opened water outlet valve by means of pressing the deformable wall.

As already indicated, the rigid wall structure of the portable drinking device of the present invention may both provide a top and a lateral enclosure of the water reservoir which is closed at its bottom by the closure element. The rigid wall structure may, for example, comprise a rigid wall made of plastics of any color. A polished outer surface of the wall structure both adds to the appealing visual appearance of the portable drinking device and helps to easily clean the drinking bowl of the portable drinking device of the present invention.

When the closure element closing the water reservoir at its bottom essentially consists of an elastic body which includes the elastic deformable wall and comprises a ring including a sealing groove accepting a bottom edge of the wall structure, the overall construction of the portable drinking device of the present invention is kept quite simple. On the other hand, the rim of the elastic body provides high friction against lateral movements of the portable drinking device when standing on the ground. I.e. the portable drinking device according to the present invention is not easily pushed around by a drinking animal.

The closure element may alternatively comprise a rigid rim to be coupled to a bottom edge of the wall structure. For this coupling, the rigid rim may comprise a thread to be screwed onto the bottom edge of the wall structure or a bayonet coupling.

When the closure element comprises a rigid rim to be connected to the bottom edge of the wall structure there may be an additional ring-shaped elastic seal sealing the rigid rim against the bottom edge of the wall structure.

The air inlet valve of the portable drinking device of the present invention is preferably provided in the flexible wall of the closure element. Alternatively, it may be provided in the rigid wall structure anywhere outside the drinking bowl. However, an air inlet valve in the closure element is not affecting the visual appearance of the rigid wall structure, and it is easily sealed in by means of the elastic material of the elastically deformable wall.

When the air inlet valve is provided in the flexible wall, it is preferably provided out of the center of the flexible wall where the height of the water reservoir is higher and typically provides more vertical free space for the air inlet valve than somewhere in the center of the portable drinking device of the present invention.

When a movable valve body of the water outlet valve flushes with an outer surface delimiting the drinking bowl, the ground of the drinking bowl is defined by a essentially flat surface despite the provision of the water outlet valve in this area.

To be able to empty the water reservoir by pushing in the flexible wall to the farthest extent, the water outlet passage should end at a low level of the drinking bowl, and it should start at a low level of the water reservoir. The latter point, however, is less important as the bottom of the water reservoir is raised by pushing in the deformable wall.

When the wall structure comprises a back flow opening closed by a removable plug at a lowest level of the drinking bowl, this plug may be removed to allow non-drunken water to flown back into the water reservoir. This particularly helps to stretch the water supply, if there is no source of fresh water available.

To make complete cleaning of the portable drinking device of the present invention particularly easy, the water outlet valve may be removable out of the water outlets passage.

This allows for separating these parts and for then placing at least the rigid wall structure in a dishwasher for intensive cleaning.

For the purpose of being removable out of the water outlet passage, the water outlet valve may comprise a thread to be screwed into a valve seat in the water outlet passage or a bayonet coupling or a press-fit coupling. Further a sealing ring may be provided between the water outlet valve and a part of the rigid wall structure extending around the water outlet passage.

Although involuntary deformations of the deformable wall of the portable drinking device of the present invention will not result in water emerging out of the water outlet valve unless the actuation element of the water outlet valve is pressed, a rigid removable transport cover plate may be provided for the elastically deformable wall to avoid any involuntary deformation of this wall.

Particularly, this transport cover plate may be part of a closable transport bag enclosing the wall structure and the closure element. Such a bag may additionally have a handle for the ease of carrying.

Figure 1:
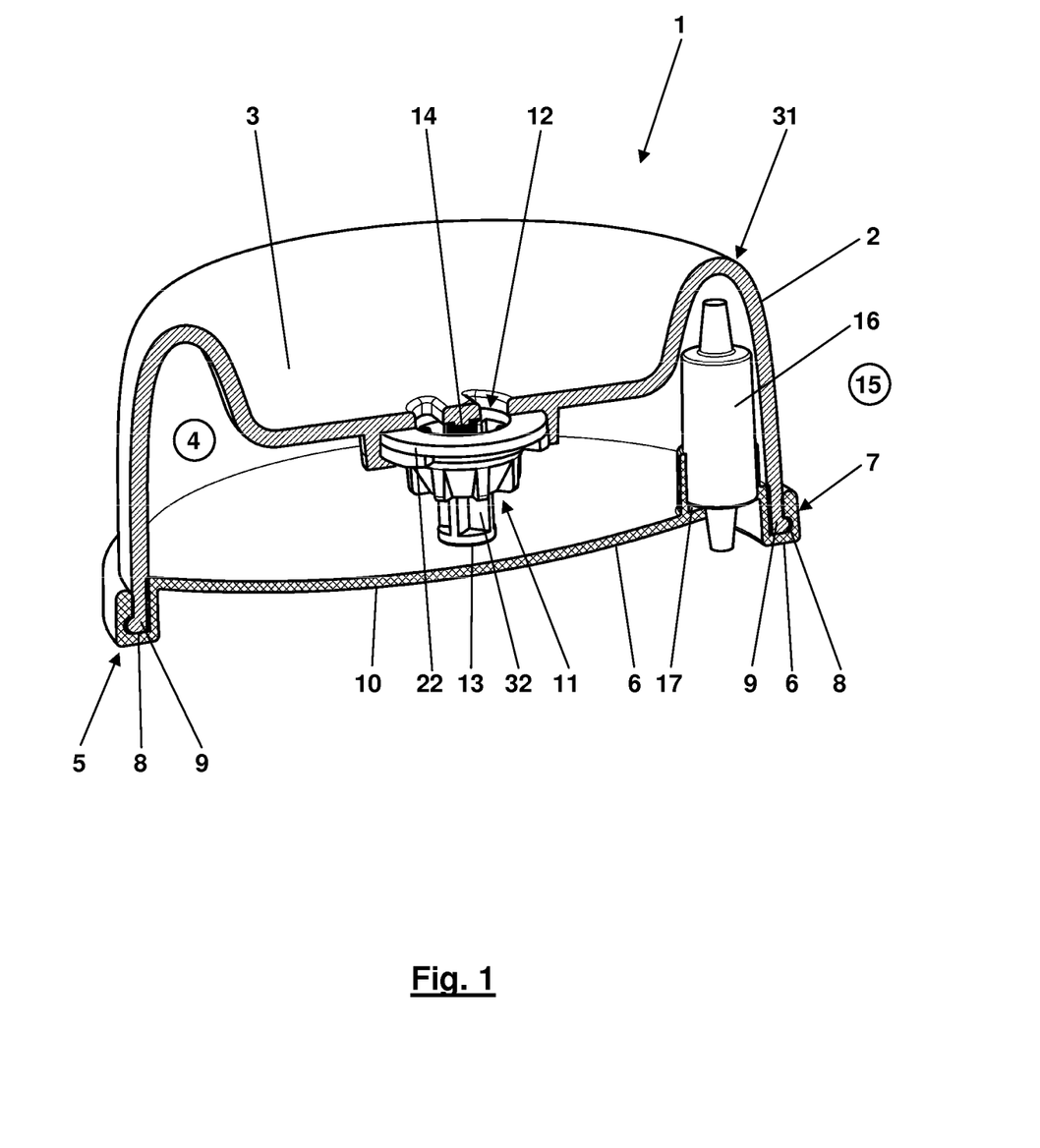
FIG. 1 is a partially cross-sectional perspective showing a first embodiment of the portable drinking device of the present invention.

Referring now in greater detail to the drawings, FIG. 1 shows a portable drinking device 1 of the present invention in which a rigid wall structure 2 forms a drinking bowl 3 at the top and partially encloses a water reservoir 4. The water reservoir 4 is provided to accept and hold water for filling the drinking bowl 3. Besides being enclosed by the rigid wall structure 2 at its top and in all lateral directions, the water reservoir is closed by a removable closure element 5 at its bottom. The removable closure element essentially consist of an elastic body 6. This elastic body 6 comprises a rim 7. An undercut sealing groove 8 in the rim 7 accepts a bottom edge 9 of the rigid wall structure in a water-tight way. Nevertheless, the closure element 5 is easily removed from the rigid wall structure 2. When the rigid wall structure 2 is then held upside down, the water reservoir 4 may be filled with water, and it may be closed again with the closure element 5.

The closure element 5 further comprises an elastically deformable wall 10 which may be pushed-in to apply pressure to the water in the water reservoir 4. However, this hydrostatic pressure alone does not result in water flowing from the reservoir 4 through a water outlet passage 12 into the drinking bowl 3. This is due to the fact that a water outlet valve 11 provided in the water outlet passage 12 extending from the water reservoir 4 to the drinking bowl 3 is only opened when an actuation element 13 is operated. Thus, the water outlet valve 11 only opens when the actuation element 13 protruding towards the elastically deformable wall 10 is operated by pushing the wall 10 upwards against the actuation element 13 and by pressing the actuation element 13 via the wall. As soon as the water outlet valve 11 is opened, water from the water reservoir 4 which is set under pressure by the pushed-in elastically deformable wall 10 flows into the drinking bowl 3. As soon as the pressure on the wall 10 is released, the actuation element 13 is forced back into its starting position by a spring 14, and the water flow into the drinking bowl 3 stops.

When the elastically deformable wall 10 gets back in its original position due to inherent elastic restoring forces, an underpressure occurs in the water reservoir 4 because of the missing water which has been transferred into the drinking bowl 3. The space of this water is then filled by air sucked into the water reservoir out of the surroundings 15 through a no-return valve 16. The no-return valve 16 opens because of the pressure difference between the underpressure in the water reservoir 4 and the surroundings 15, and it is an air inlet valve only. The no-return valve 16 is mounted in a passage 17 through the elastic body 6 in a water-tight way. It is positioned out of the center of the deformable wall 10 so that it is placed below a curvature 28 of the rigid wall structure 2 forming a rim of the drinking bowl 3. Here, there is more free vertical space than in the center below the ground of the drinking bowl 3.

Figure 2:
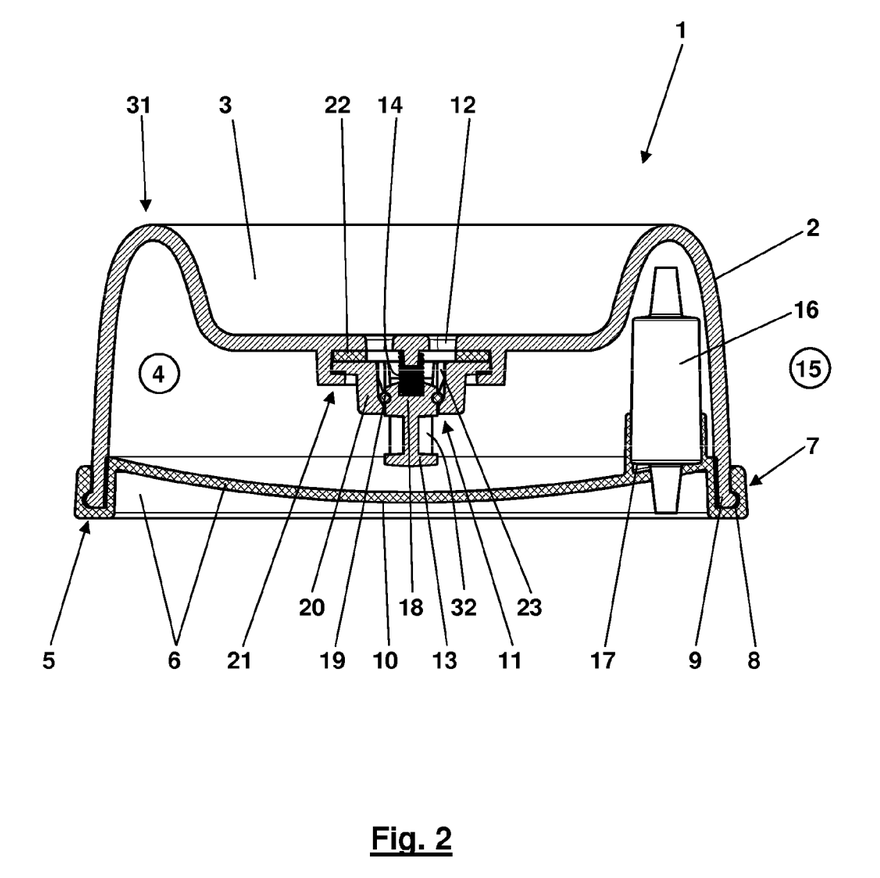
FIG. 2 is a vertical section through the embodiment of the portable drinking device of FIG. 1.

In the vertical cross-section according to FIG. 2 the water outlet valve 11 in the water passage 12 is also sectioned. Thus, it can be seen that the actuation element 13 is a movable valve body 18 of the water outlet valve 11 biased by the spring 14 into a closing position closing the water outlet passage 12. In this closing position the movable valve body 18 seals the water passage 12 through a fixed valve body 20 by means of a sealing ring 19. The fixed valve body 20 is coupled via a bayonet coupling 21 to the rigid wall structure 2. A further sealing ring 22 is arranged between the fixed valve body 20 and the rigid wall structure 2 surrounding the water outlet passage 12.

Figure 3:
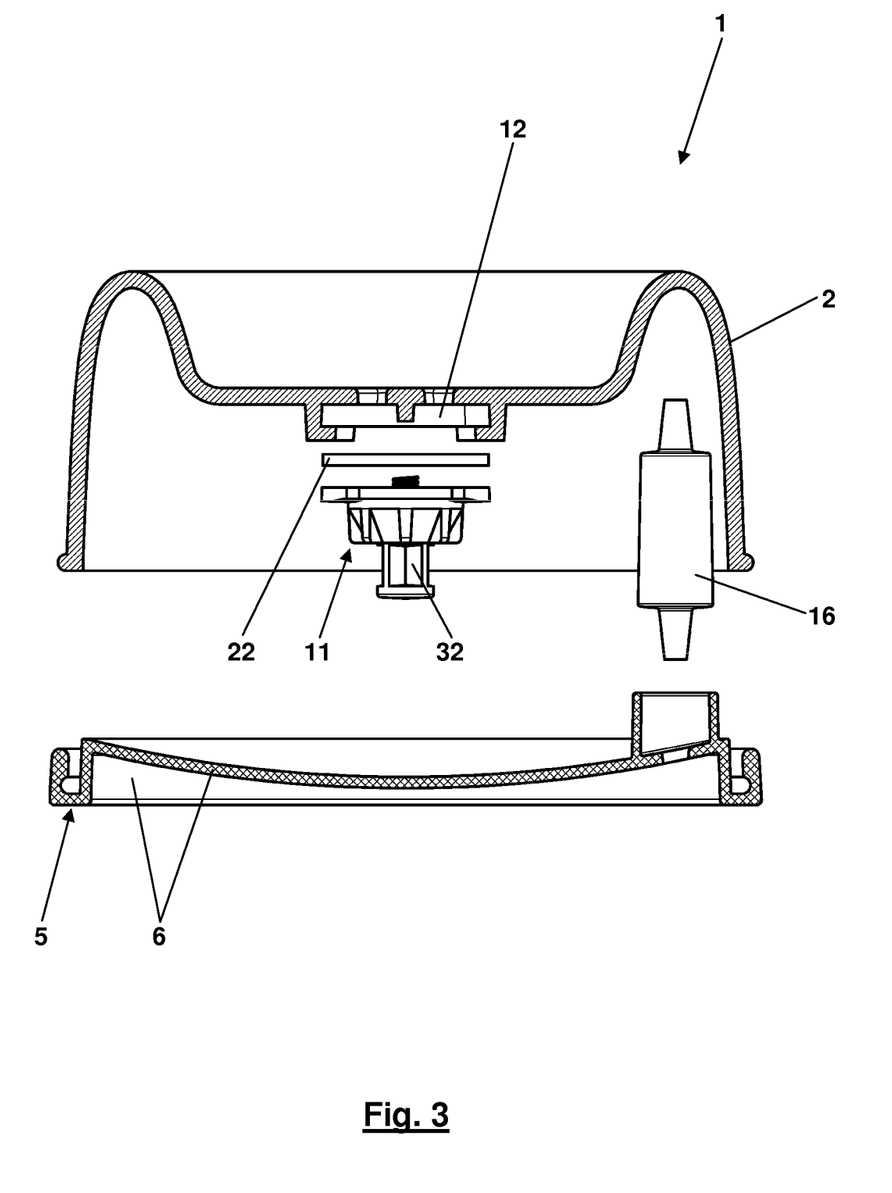
FIG. 3 is an exploded view of the portable drinking device of FIG. 1.

FIG. 3 shows the parts of the portable drinking device according to the present invention into which it is easily dismounted for cleaning purposes. The closure element 5 is removed from the rigid wall structure 2. The air inlet valve 16 is removed from the elastic body 6 forming the closure element 5. The water outlet valve 11 is removed out of the water outlet passage 12 together with the sealing ring 22. After dismounting the portable drinking device 1 in this way, at least the rigid wall structure 2 and preferably also the water outlet valve 11 may be placed in a dishwasher for intensive cleaning.

Figure 4A:
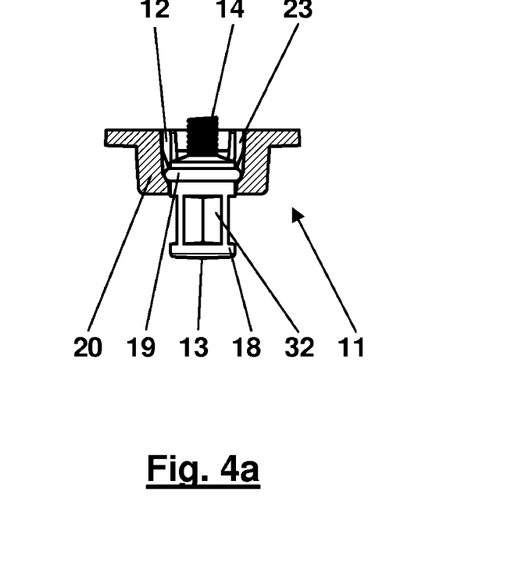
FIG. 4 shows a closed (a) and an opened (b) position of a water outlet valve of the portable drinking device of FIG. 1.
Figure 4B:
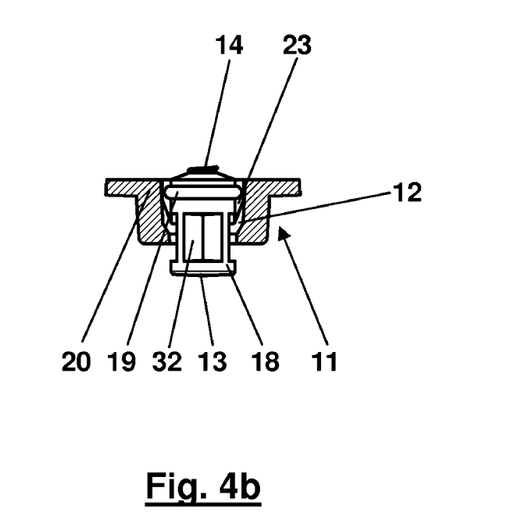

FIG. 4 shows the closed position (a) of the water outlet valve 11 in which the water outlet passage 12 is blocked between the movable valve body 18 and the fixed valve body 20 by the sealing ring 19. In the opened position (b) of the water outlet valve 11, the water passage 12 through the water outlet valve 11 is opened and extends through grooves 32 in the movable valve body 18 and grooves 23 in the fixed valve body 20 which bypass the sealing ring 19. The water outlet valve 11 is transferred into its opened position (b) by operating or pushing-in the movable valve body 18 which serves as the actuation element of the water outlet valve 11 against the biasing force of the spring 14. As soon as the actuation element 13 is no longer operated, i.e. pushed in against the force of the spring 14, the water outlet valve 11 returns into its closed position (a).

Figure 5:
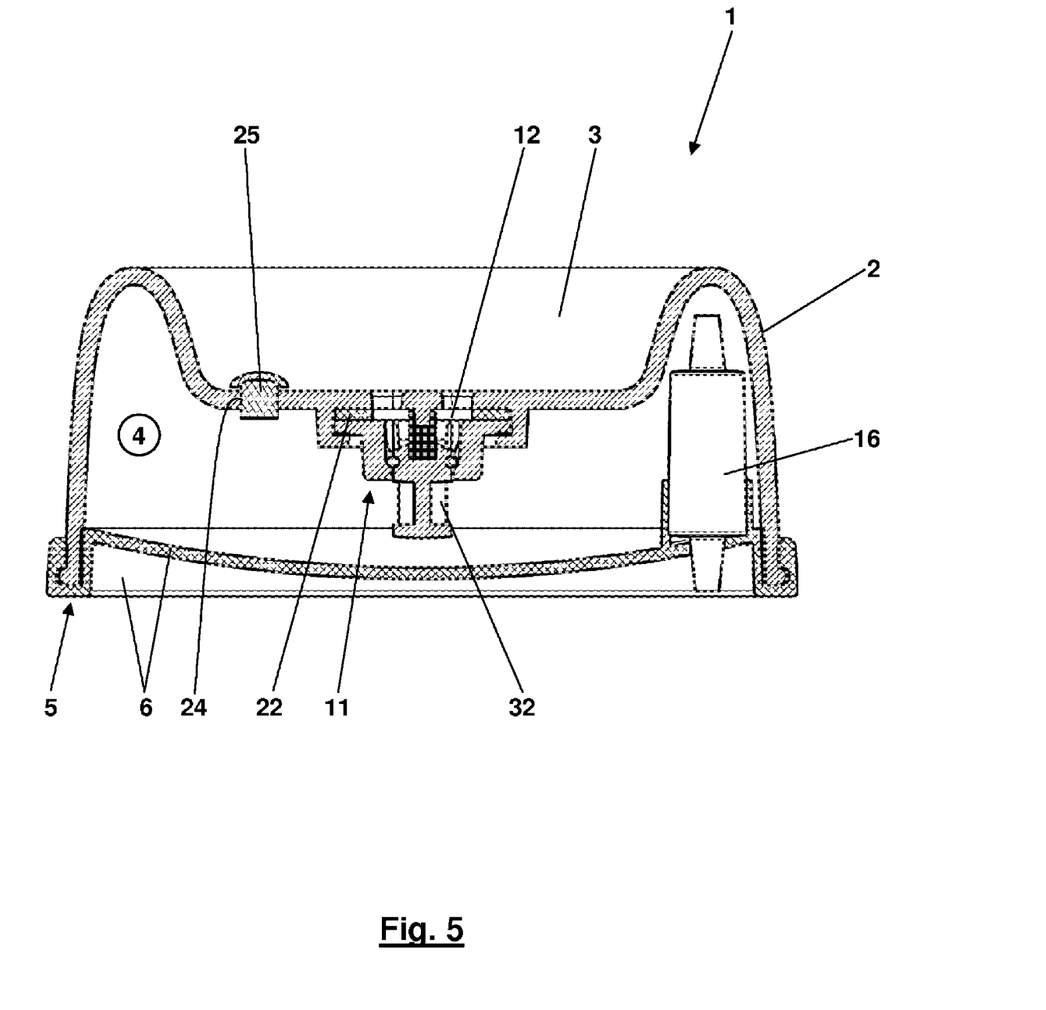
FIG. 5 is a vertical section through a second embodiment of the portable drinking device of the present invention.

The embodiment of the portable drinking device 1 according to FIG. 5 differs from that one according to the previous figures in that an additional backflow opening 24 is provided at the ground of the drinking bowl 3 within the rigid wall structure 2. This backflow opening 24 is normally closed by a removable plug 25. Removing the plug 25 allows unused water to flow back out of the drinking bowl 3 into the water reservoir 4 to save it for later use.

Figure 6:
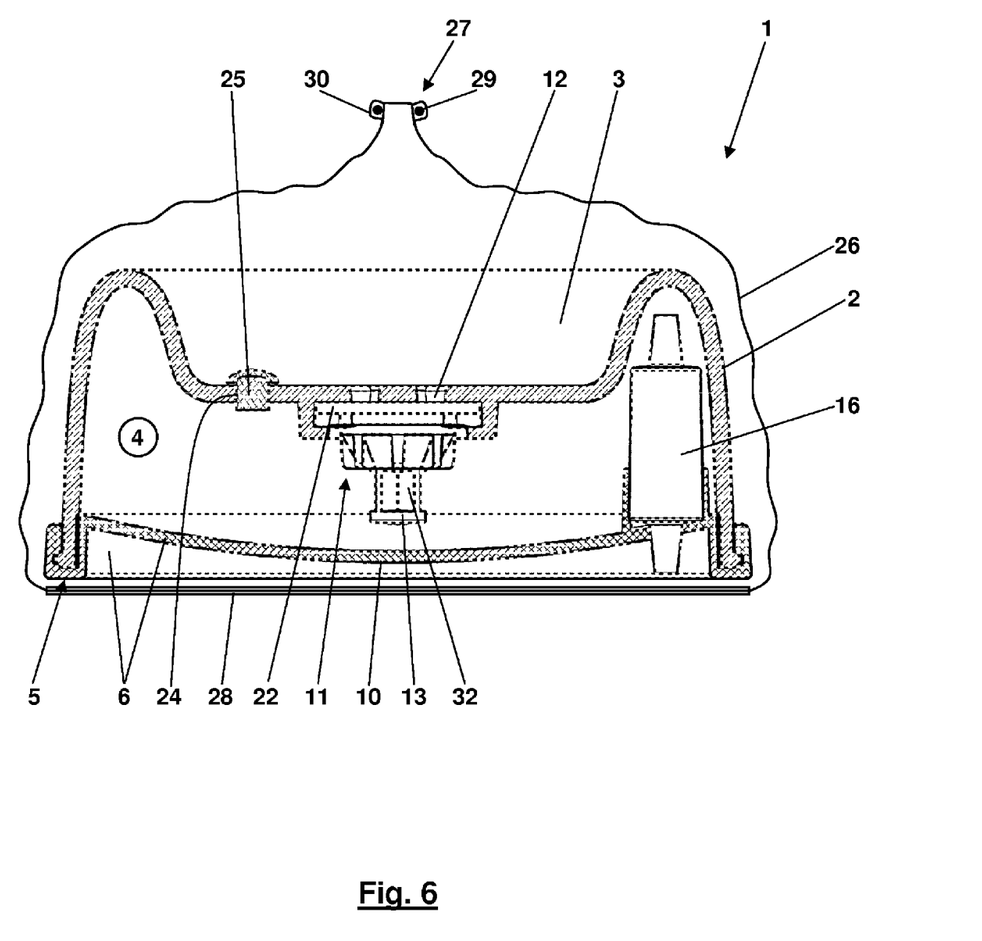
FIG. 6 is a vertical section through a third embodiment of the portable drinking device of the present invention.

The embodiment of the portable drinking device 1 according to FIG. 6 comprises the portable drinking device 1 according to FIG. 5 plus a transport bag 26. The transport bag 26 comprises an openable closure 27 at its top end. At its bottom end, the transport bag includes a rigid transport cover plate 28 which is, for example, made of hard plastics and which covers the entire deformable wall 10 to protects the wall 10 against accidentally being pushed-in. In this way, it is avoided that any water accidentally gets out of the water reservoir 4. The closure 27 of the transport bag may include a rope 29 which extends through and out of a hemstitch seam 30 and which is provided with an adjustable rope stop (not depicted here).

Many variations and modifications may be made to the preferred embodiments of the invention without departing substantially from the spirit and principles of the invention. All such modifications and variations are intended to be included herein within the scope of the present invention, as defined by the following claims.

I claim:

1. A portable drinking device for pets, comprising:
    a rigid wall structure which
        provides a drinking bowl at its top,
        partially encloses a water reservoir below the drinking bowl, and
        has an opening at its bottom;
    a water outlet passage which
        starts in the water reservoir, and
        leads into the drinking bowl;
    a water outlet valve which
        is arranged in the water outlet passage,
        normally closes the water outlet passage, and
        comprises an actuation element which, when operated, actuates the water outlet valve to open the water outlet passage;
    a removable closure element which
        closes the opening at the bottom of the wall structure and thus the water reservoir in a water-tight way, and
        includes an elastically deformable wall which, when pushed in, operates the actuation element of the water outlet valve and presses water out of the water reservoir through the opened outlet passage into the drinking bowl; and
    an air inlet valve which
        is a no-return valve and
        leads from outside the drinking bowl into the water reservoir,
    wherein the wall structure provides a top and lateral enclosure of the water reservoir,
    wherein the closure element provides a bottom enclosure of the water reservoir, and
wherein the closure element essentially consists of an elastic body which includes the elastically deformable wall and comprises a rim including a sealing groove accepting a bottom edge of the wall structure.

2. The portable drinking device of claim 1, wherein the actuation element is a movable valve body biased by a spring into an outlet passage closing position.

3. The portable drinking device of claim 1, wherein the sealing groove in the rim of the elastic body comprises an undercut accepting a flange of the bottom edge of the wall structure.

4. A portable drinking device for pets, comprising:
    a rigid wall structure which
        provides a drinking bowl at its top,
        partially encloses a water reservoir below the drinking bowl, and
        has an opening at its bottom;

a water outlet passage which
   starts in the water reservoir, and
   leads into the drinking bowl;
a water outlet valve which
   is arranged in the water outlet passage,
   normally closes the water outlet passage, and
   comprises an actuation element which, when operated, actuates
the water outlet valve to open the water outlet passage;
a removable closure element which
   closes the opening at the bottom of the wall structure and thus the water reservoir in a water-tight way, and
   includes an elastically deformable wall which, when pushed in, operates the actuation element of the water outlet valve and presses water out of the water reservoir through the opened outlet passage into the drinking bowl; and
an air inlet valve which
   is a no-return valve and
   leads from outside the drinking bowl into the water reservoir,
wherein the air inlet valve is provided in the flexible wall.

5. The portable drinking device of claim 4, wherein the wall structure provides a top and lateral enclosure of the water reservoir.

6. The portable drinking device of claim 5, wherein the closure element provides a bottom enclosure of the water reservoir.

7. The portable drinking device of claim 4, wherein the closure element comprises a rigid rim to be coupled a bottom edge of the wall structure.

8. The portable drinking device of claim 7, wherein the rigid rim comprises a coupling formation selected from a thread to be screwed onto the bottom edge of the wall structure and a bayonet coupling to be bayonet coupled to the bottom edge of the wall structure.

9. The portable drinking device of claim 7, wherein the closure element comprises a ring-shaped elastic seal sealing the rigid rim against the bottom edge of the wall structure.

10. The portable drinking device of claim 4, wherein the air inlet valve is provided out of the center of the flexible wall.

11. The portable drinking device of claim 4, wherein the water outlet passage ends at a low level of the drinking bowl.

12. The portable drinking device of claim 4, wherein the water outlet passage starts at a low level of the water reservoir.

13. The portable drinking device of claim 4, wherein the wall structure comprises a backflow opening closed by a removable plug at a lowest level of the drinking bowl.

14. The portable drinking device of claim 4, wherein the water outlet valve is removable out of the water outlet passage.

15. The portable drinking device of claim 14, wherein a sealing ring I arranged between the water outlet valve and a part of the rigid wall structure bordering the water outlet passage.

16. The portable drinking device of claim 14, wherein the water outlet valve comprises a coupling formation selected from thread to be screwed, a bayonet coupling to be bayonet coupled, or a press-fit coupling to be press-fitted into a valve seat in the water outlet passage provided at the wall structure.

17. The portable drinking device of claim 4, wherein a rigid removable transport cover plate is provided for the elastically deformable wall.

18. The portable drinking device of claim 17, wherein the transport cover plate is part of a closable transport bag enclosing the wall structure and the closure element.

19. The portable drinking device of claim 4, wherein the actuation element is a movable valve body biased by a spring into an outlet passage closing position.

20. A portable drinking device for pets, comprising:
a rigid wall structure which
   provides a drinking bowl at its top,
   partially encloses a water reservoir below the drinking bowl, and
   has an opening at its bottom;
a water outlet passage which
   starts in the water reservoir, and
   leads into the drinking bowl;
a water outlet valve which
   is arranged in the water outlet passage,
   normally closes the water outlet passage, and
   comprises an actuation element which, when operated, actuates the water outlet valve to open the water outlet passage;
a removable closure element which
   closes the opening at the bottom of the wall structure and thus the water reservoir in a water-tight way, and
   includes an elastically deformable wall which, when pushed in, operates the actuation element of the water outlet valve and presses water out of the water reservoir through the opened outlet passage into the drinking bowl;
an air inlet valve which
   is a no-return valve,
   is provided in the flexible wall at a point out of the center of the flexible wall, and
   leads from outside the drinking bowl into the water reservoir; and
a closable transport bag which
   encloses the wall structure and the closure element and includes a rigid transport cover plate for the elastically deformable wall.

* * * * *